(12) United States Patent
Tajima et al.

(10) Patent No.: US 6,592,489 B2
(45) Date of Patent: Jul. 15, 2003

(54) TRANSMISSION EQUIPPED WITH PLANETARY GEAR MECHANISM AND PLANETARY GEAR MECHANISM

(75) Inventors: Shigeru Tajima, Tochigi-ken (JP); Masahiro Imamura, Tochigi-ken (JP); Yasuhiro Morimoto, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/775,552

(22) Filed: Feb. 5, 2001

(65) Prior Publication Data

US 2001/0012808 A1 Aug. 9, 2001

(30) Foreign Application Priority Data

| Feb. 8, 2000 | (JP) | 2000-030571 |
| Feb. 8, 2000 | (JP) | 2000-030572 |
| Feb. 10, 2000 | (JP) | 2000-033940 |

(51) Int. Cl.⁷ .................................................. F16H 3/62
(52) U.S. Cl. ...................... 475/323; 475/297; 475/284; 475/318
(58) Field of Search .................. 475/275, 279, 475/286, 290, 297, 317, 318, 323, 284; 192/87.11, 225

(56) References Cited

U.S. PATENT DOCUMENTS

| 4,261,227 A | * | 4/1981 | Yamamori et al. | 475/284 X |
| 5,846,153 A | * | 12/1998 | Matsuoka | 475/317 X |
| 6,110,069 A | * | 8/2000 | Taniguchi et al. | 475/275 X |
| 6,290,048 B1 | * | 9/2001 | Kohlmeier et al. | 475/323 X |

FOREIGN PATENT DOCUMENTS

| JP | 59-126136 | | 7/1984 | |
| JP | 1-203740 | | 8/1989 | |
| JP | 402296044 | * | 12/1990 | 475/284 |

* cited by examiner

*Primary Examiner*—Charles A Marmor
*Assistant Examiner*—Ha Ho
(74) *Attorney, Agent, or Firm*—Armstrong, Westerman & Hattori, LLP (57) ABSTRACT

In a transmission with a built-in planetary gear mechanism which has an element to be fixed to a casing of the transmission, inner elements are sub-assembled by mounting a plurality of transmission constituting members inclusive of the planetary gear mechanism. After containing the inner elements inside the casing, the element to be fixed is arranged to be fixable to the casing from a peripheral wall portion of the casing. The element to be fixed is fixed to the cylinder portion of a hydraulic brake to be built in the transmission. The cylinder portion is fixed to the casing by means of fixing members which are inserted into the casing from an outside of the peripheral wall portion of the transmission casing.

4 Claims, 4 Drawing Sheets

TRANSMISSION EQUIPPED WITH PLANETARY GEAR MECHANISM AND PLANETARY GEAR MECHANISM

BACKGROUND OF THE INVENTION

1. Field of the Invention

The present invention relates to a transmission equipped with a planetary gear mechanism which has an element to be fixed to a transmission casing, and also relates to a planetary gear mechanism.

2. Description of Related Art

In case an element such as a ring gear, a carrier, or the like of a planetary gear mechanism is fixed to a transmission casing in the above-described kind of conventional transmission, the above-described element is engaged with the transmission casing by means of a spline so as not to be rotatable relative to the transmission casing, and is fixedly engaged by a snap ring so as to be relatively immovable in an axial direction (see Japanese Published Unexamined Patent Application No. 203740/1989). In order to facilitate the assembling work of the transmission, it is desirable to take the following steps. Namely, in an open space outside the transmission casing, transmission constituting elements including a planetary gear mechanism assembled around shaft members of the transmission in sequence in an axial direction. Thereafter, these transmission constituting elements are contained or put inside the transmission casing.

However, in the above-described conventional transmission in which that element of the planetary gear mechanism which is to be fixed is fixedly engaged by a snap ring in a manner not to be movable in the axial direction, there is the following disadvantage. Namely, if another transmission constituting element is present on this side of the planetary gear as seen from an open end of the transmission casing, this transmission constituting element in question will be an obstacle to the mounting of the snap ring. It follows that the planetary gear mechanism cannot be sub-assembled together with this transmission constituting element around a shaft member. As a consequence, the assembly work of the transmission constituting elements into the transmission casing must be made from the innermost element in sequence toward the outermost element, resulting in a troublesome assembly work of the transmission.

In view of the above points, the present invention has an object of providing a transmission in which that element of the planetary gear which is to be fixed can be fixed to the transmission casing from an outside of the peripheral wall portion of the transmission casing so that the workability in the assembly work can be improved.

Further, among the planetary gear mechanisms to be built into the transmission, there is one in which a sun gear is coupled to a power transmission member which is disposed on one axial side of the planetary gear mechanism. One of a ring gear and a carrier, e.g., the carrier is coupled to a transmission member which is disposed on the axially opposite side of the planetary gear mechanism. In this kind of planetary gear mechanism, the following arrangement was employed in the conventional art. Namely, the sun gear and the carrier are fixed by welding or the like to the corresponding power transmission member. In the steps of assembling the transmission, the sun gear and the carrier are assembled in sequence around the shaft of the transmission together with the corresponding power transmission member, thereby assembling the planetary gear mechanism. However, in the above-described conventional art, if the power transmission member on one axial side and the power transmission member on the axially opposite side deviate in the axial position, the axial position of the sun gear and the carrier to be fixed to these power transmission members also axially deviate. In order to prevent the sun gear and the carrier from giving rise to the mutual interference, there is secured a larger axial clearance than an amount of deviation anticipated between the sun gear and the carrier. As a result, there is a disadvantage in that the planetary gear mechanism occupies a larger axial space. In addition, when the carrier is assembled, a plurality of planetary pinions to be carried on the carrier must be brought into gearing mesh with the sun gear. Therefore, it takes time to assemble the carrier. If the sun gear and the carrier are assembled in the steps of assembling the transmission as in the conventional way, the assembling work of the transmission becomes troublesome.

In view of the above points, the present invention has another object of providing a planetary gear mechanism which has a smaller space in the axial direction and which has an improved workability in assembling.

In planetary gear mechanisms to be built into the transmission, there is one having the following construction. Namely, that carrier of a planetary gear mechanism which rotatably supports a planetary pinion through a pinion shaft has coupled thereto a cylindrical power transmission member, e.g., a clutch inner member of a hydraulic clutch, which is disposed on one axial side of the planetary gear mechanism. Conventionally, in this kind of planetary gear mechanism, the clutch inner member is fixed to a side plate portion on one axial side of the carrier by means of welding or riveting (see Japanese Published Unexamined Patent Application No. 126136/1984). Further, the following arrangement is conventionally employed. Namely, a shaft hole is respectively formed through the side plate portions on both axial sides of the carrier. A pinion shaft is inserted through the shaft holes and both ends thereof are caulked to thereby prevent the pinion shaft from rotating and from dropping out of position relative to the carrier. The objects of preventing the pinion shaft from rotating are as follows. Namely, in order to supply lubricating oil to bearings on the outer circumference of the pinion shaft, the pinion shaft is fixed such that a radial oil hole formed in the pinion shaft comes into a phase which faces a radial direction of the carrier. In this manner, the lubricating oil is efficiently supplied to the bearings by a centrifugal force due to the rotation of the carrier.

However, as in the above-described conventional example, if the clutch inner member is welded to the carrier, the carrier and the clutch sometimes give rise to thermal strains. Also in case the clutch inner member is riveted to the carrier, it is necessary to mount the clutch inner member on the carrier in a step which is other than the step of mounting the pinion shaft to the carrier by caulking. As a result, it takes much time in assembling the carrier, resulting in a high cost.

In view of the above points, the present invention has still another object of providing a low-cost planetary gear mechanism in which the power transmission member and the pinion shaft can be fixed while preventing them from rotating relative to the carrier only by preventing, from being axially pulled out of position, a cylindrical power transmission member to be disposed in one axial side of the planetary gear mechanism and the pinion shaft.

SUMMARY OF THE INVENTION

In order to attain the above and other objects, according to a first feature of the present invention, there is provided a transmission equipped with a planetary gear mechanism which has an element to be fixed to a transmission casing, wherein a cylinder portion of a hydraulic brake to be built in the transmission is disposed around the planetary gear mechanism and the element is fixed to the cylinder portion, and wherein the cylinder portion is fixed to the transmission casing by a fixing member which is insertable into the transmission casing from an outside of a peripheral wall portion of the transmission casing.

According to the above-described first feature of the present invention, when the transmission constituting members including the planetary gear mechanism and the hydraulic brake are sub-assembled in an open space outside the transmission casing to thereby assemble the inner elements of the transmission, the following steps may be taken. Namely, that element of the planetary gear mechanism which is to be fixed is fixed to the cylinder portion of the hydraulic brake. After the sub-assembled inner elements are contained inside the transmission casing, the fixing member is inserted into the transmission casing from the outside of the peripheral wall portion, and then the cylinder portion of the hydraulic brake is fixed to the transmission casing. That element of the planetary gear mechanism which is to be fixed is thus fixed to the transmission casing through the cylinder portion of the hydraulic brake. Therefore, even if the transmission constituting members are sub-assembled, the assembling of the transmission can be performed without any problem, resulting in an improved workability in the assembling of the transmission.

Further, if that element of the planetary gear mechanism which is to be fixed is directly fixed to the transmission casing, noises are likely to occur due to the conveyance of the vibrations from this element to the transmission casing. According to the above-described first feature, however, the cylinder portion of the hydraulic brake is interposed between the above-described element and the transmission casing. Therefore, the conveyance of the noises to the transmission casing is restricted, with the result that the noises are reduced.

In order to attain another object as described above, according to another feature of the present invention, there is provided a planetary gear mechanism to be built into a transmission, comprising: that first element of a planetary gear mechanism which is made up of a sun gear; that second element of the planetary gear mechanism which is made up of one of a ring gear and a carrier, the first element and the second element being coupled respectively to a first power transmission member which is disposed on one axial side of the planetary gear mechanism, and to a second power transmission member which is disposed on an axially opposite side of the planetary gear mechanism, wherein the second element has formed therein a cylindrical portion which is inserted into an inner circumference of the first element with a diametrical clearance therebetween; wherein the first element is axially positioned relative to the cylindrical portion through an annular projection which is formed on an inner circumference of the first member, and wherein the first element is coupled to the first power transmission member with an axial play.

According to another feature of the present invention as described above, it is possible to sub-assemble the first element and the second element in advance to thereby couple them together in a manner axially inseparable from each other. Therefore, in the step of assembling the transmission, it is possible to assemble the first element and the second element around the shaft of the transmission in a sub-assembled state. As a result, the assembling work of the transmission becomes easy.

Further, since the first element is axially fixed in position relative to the second element, there is no need of securing an axial clearance in order to prevent the interference between the two elements. The axial space of the planetary gear mechanism can thus be reduced. Even if the first power transmission member for coupling thereto the first element axially deviates relative to the second element, this deviation is absorbed by the play of the first element relative to the first power transmission member. Therefore, there is no disadvantage in axially positioning the first element relative to the second element.

In order to attain still another object as described above, according to still another feature of the present invention, there is provided a planetary gear mechanism to be built into a transmission in which a cylindrical power transmission member which is disposed on one axial side of the planetary gear mechanism is coupled to that carrier of the planetary gear mechanism which rotatably supports a planetary pinion through a pinion shaft. The planetary gear mechanism comprises: a supporting portion which is formed in a side plate portion on one axial side of the carrier, the supporting portion being fitted into the power transmission member; a first engaging portion which is made up of one of a non-circular projection and recess formed in an end surface of the pinion shaft which protrudes through a shaft hole formed in the side plate; and a second engaging portion which is made up of one of a non-circular recess and projection formed in that end surface of the power transmission member which is on a side of the side plate portion, the second engaging portion being engaged with the first engaging portion when the pinion shaft is in a predetermined phase.

When the first and second engaging portions are engaged together, the power transmission member is prevented by the pinion shaft from rotating relative to the carrier. In addition, the pinion shaft is prevented by the power transmission member from rotating relative to the carrier in a predetermined phase. In this manner, simply by preventing, with a suitable means, the power transmission member and the pinion shaft from being axially pulled out of position relative to the carrier, the power transmission member and the pinion shaft can be fixed by preventing them from rotating relative to the carrier. Therefore, a troublesome work of fixing the power transmission member and the pinion shaft to the carrier such as welding or riveting is no longer required, with the result that the assembly work of the carrier becomes easy. In particular, if a first snap ring is mounted on the supporting portion so as to prevent the power transmission member from being pulled out of position relative to the supporting portion, and if a second snap ring is mounted on the pinion shaft so as to prevent the pinion shaft from being axially pulled out of position to thereby prevent the power transmission member and the pinion shaft from being axially pulled out of position, the assembly work of the carrier is further improved.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
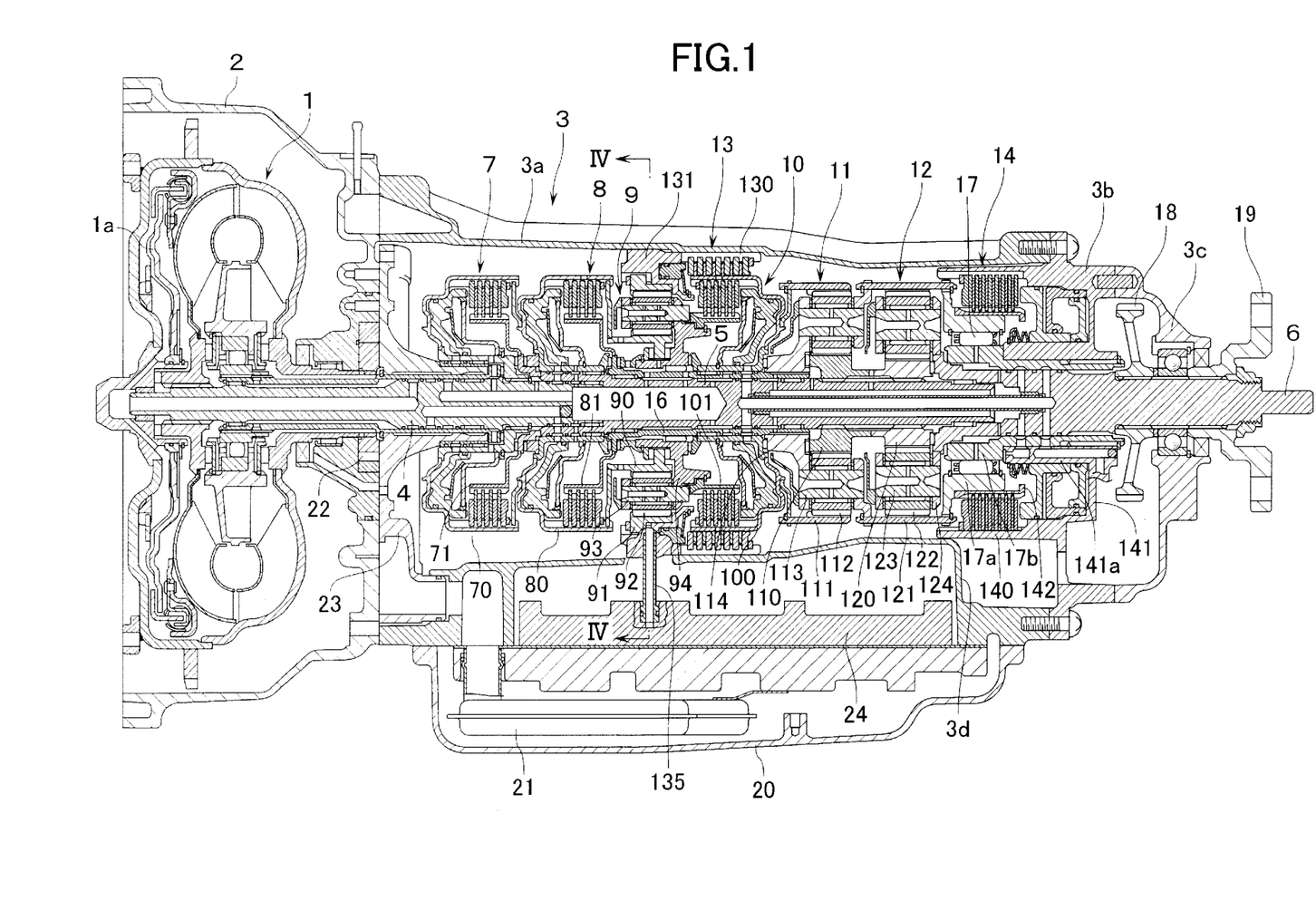
FIG. 1 is a vertical sectional view of one example of a transmission according to the present invention.

FIG. 1 shows an automatic transmission for a motor vehicle. This transmission is provided with a transmission casing 3 which is coupled to a torque converter casing 2 containing therein a fluid torque converter 1 equipped with a lock-up clutch 1a. Inside this transmission casing 3, there are rotatably supported on the same axial line an input shaft 4 which is coupled to the fluid torque converter 1, an intermediate shaft 5 and an output shaft 6. Around these shafts 4, 5, 6 there are disposed in the order mentioned, as seen from the side of the torque converter casing 2, a first hydraulic clutch 7, a second hydraulic clutch 8, a first planetary gear mechanism 9, a third hydraulic clutch 10, a second planetary gear mechanism 11 and a third planetary gear mechanism 12. Further, there is disposed a first hydraulic brake 13 around the third hydraulic clutch 10, and a second hydraulic brake 14 is disposed at an axial front of the third planetary gear mechanism 12.

Each of the planetary gear mechanisms 9, 11, 12 is made up of: a sun gear 90, 110, 120; a ring gear 91, 111, 121; planetary pinions 92, 112, 122 which are in gearing mesh with the sun gear and the ring gear; and a carrier 94, 114, 124 which rotatably supports each of the planetary pinions through a pinion shaft 93, 113, 123.

The input shaft 4 has coupled thereto a clutch outer member 70 of the first hydraulic clutch 7. A clutch outer member 80 of the second hydraulic clutch 8 is coupled to said clutch outer member 70, and the sun gear 90 of the first planetary gear mechanism 9 is coupled to the clutch outer member 80 of the second hydraulic clutch 8. It is thus so arranged that the clutch outer members 70, 80 of the first and second hydraulic clutches 7, 8 and the sun gear 90 of the first planetary gear mechanism 9 can be rotated together with the input shaft 4. Further, a clutch inner member 71 of the first hydraulic clutch 7 is coupled to the sun gears 110, 120 of the second and third planetary gear mechanisms 11, 12 through the intermediate shaft 5. A clutch inner member 81 of the second hydraulic clutch 8 is coupled to the carrier 114 of the second planetary gear mechanism 11 through a sleeve 16 which is rotatably supported on the intermediate shaft 5.

The ring gear 91 of the first planetary gear mechanism 9 is fixed to the transmission casing 3 as explained in more detail hereinafter. The carrier 94 of the first planetary gear mechansim 9 is coupled to a clutch inner member 101 of the third hydraulic clutch 10. A clutch outer member 100 of the third hydraulic clutch 10 is coupled to the ring gear 111 of the second planetary gear mechanism 11. The clutch outer member 100 is further arranged to be braked by the first hydraulic brake 13 relative to the transmission casing 3.

The carrier 114 of the second planetary gear mechanism 11 is coupled to the ring gear 121 of the third planetary gear mechanism 12. The ring gear 121 is arranged to be braked by the second hydraulic brake 14 relative to the transmission casing 3 and is also coupled to the transmission casing 3 through a one-way clutch 17 which serves as a reaction force receiving member. The carrier 124 of the third planetary gear mechanism 12 is coupled to the output shaft 6.

According to the above-described arrangement, when the first hydraulic clutch 7 and the second hydraulic brake 14 are engaged, the first speed transmission train is established. When the first hydraulic clutch 7 and the first hydraulic brake 13 are engaged, the second speed transmission train is established. When the first hydraulic clutch 7 and the third hydraulic clutch 10 are engaged, the third speed transmission train is established. When the first hydraulic clutch 7 and the second hydraulic clutch 8 are engaged, the fourth speed transmission train is established. When the second hydraulic clutch 8 and the third hydraulic clutch 10 are engaged, the fifth speed transmission train is established. When the second hydraulic clutch 8 and the first hydraulic brake 13 are engaged, the sixth speed transmission train is established. When the third hydraulic clutch 10 and the second hydraulic brake 14 are engaged, the reverse transmission train is established. In this manner, the speed changing of 6 stages of forward running and one stage of reverse running can be performed.

The transmission casing 3 is made up of: a casing main body 3a; an end piece 3b which is to be mounted on that end portion of the casing main body 3a which is opposite to the torque converter casing 2; and an end cover 3c which is mounted on an outer surface of the end piece 31. A parking gear 18 which is coupled to the output shaft 6 is disposed between the end piece 3b and the end cover 3c. An output flange 19 is coupled to an outer end portion of the output shaft 6 which protrudes outward from the end cover 3c.

The end piece 3b has integrally formed therein a brake outer member 140 and a cylinder portion 141 of the second hydraulic brake 14. A brake inner member 142 of the second hydraulic brake 14 is coupled to an outer race 17a of a one-way clutch 17 which is coupled to the ring gear 121 of the third planetary gear mechanism 12. In addition, an inner race 17b of the one-way clutch 17 is fitted into an inner cylindrical portion 141a of the cylinder portion 141 of the second hydraulic brake 14, to thereby fix the inner race 17b to the end piece 3b.

On an outside lower portion of the case main body 3a, there is provided an oil pan 20 through a skirt portion 3d which is integrally formed on an outer surface of the case main body 3a so as to extend downward. In addition, on that end portion of the torque converter casing 2 which is on the side of the transmission casing 3, there is provided a pump 22 which suctions the oil inside the oil pan 20 through a strainer 21. There is further provided valve blocks 23, 24 which have assembled therein those various valves inside the hydraulic circuit which are respectively coupled to the pump 22.

Figure 2:
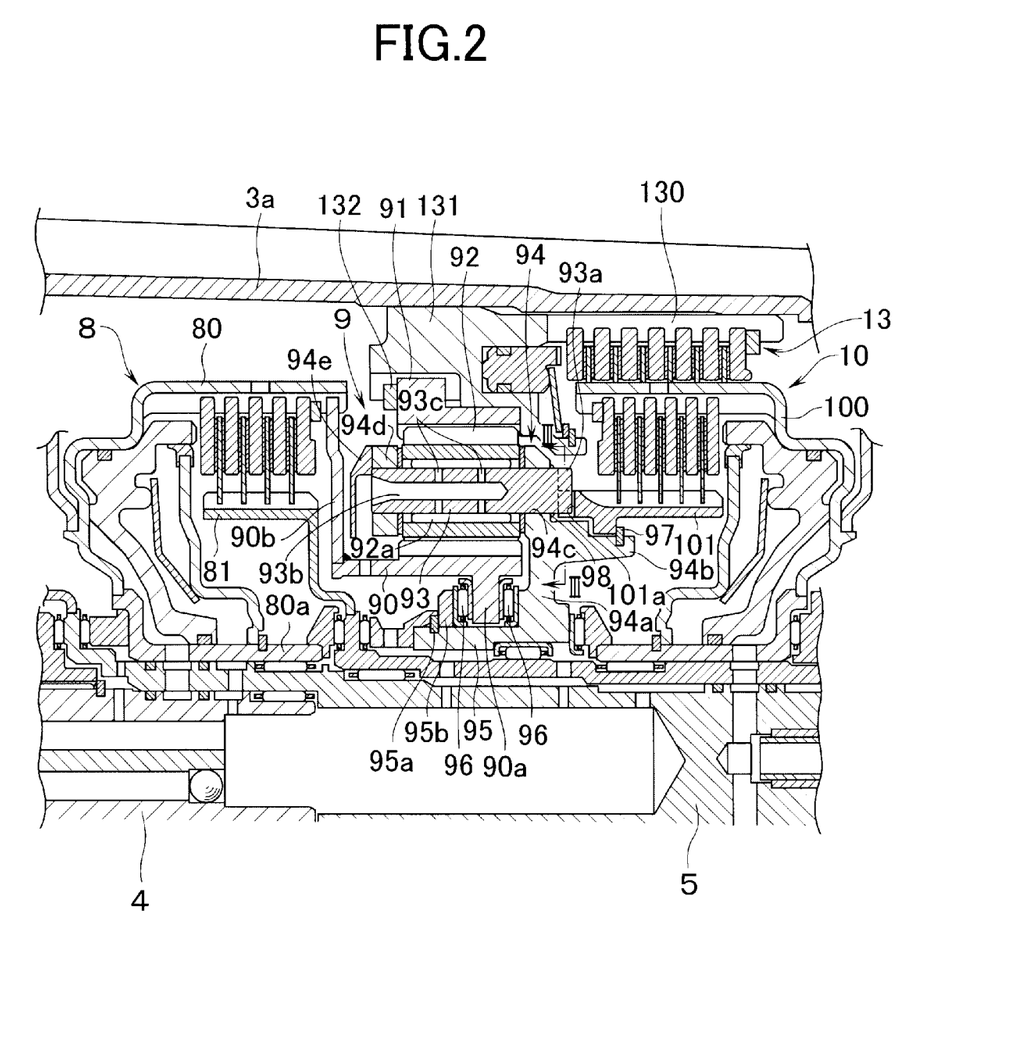
FIG. 2 is an enlarged vertical sectional view of an important portion of the transmission in FIG. 1.

As shown in FIG. 2, on that side plate portion 94a of the carrier 94 of the first planetary gear mechanism 9 which is on the side of the third hydraulic clutch 10, there is formed a cylinder portion 95 which is inserted into the inner circumference of the sun gear 90 with a radial clearance therebetween. The carrier 94 is rotatably supported on the intermediate shaft 16 at the cylinder portion 95. An annular projection 90a is formed in an inner circumference of the sun gear 90. On an outer circumference of the cylinder portion 95, there are mounted a pair of thrust bearings 96, 96 which sandwich the annular projection 90a from both axial sides, such that the thrust bearings 96, 96 are interposed between the side plate portion 94a and a washer 95b which is prevented by a snap ring 95a from dropping out of position. The sun gear 90 is thus fixedly positioned in the axial direction relative to the cylinder portion 95. The sun gear 90 is then engaged through a connecting plate 90b which is welded to the sun gear 90, by means of spline, with the clutch outer member 80 of the second hydraulic clutch 8 while maintaining an axial play.

It may be considered to employ the following construction. Namely, the sun gear 90 and the carrier 94 are made to be axially separable from each other, and the sun gear 90 is fixed to the clutch outer member 80 of the second hydraulic clutch 8 by means of welding or the like. In this arrangement, however, the sun gear 90 and the carrier 94 cannot be sub-assembled in advance. Further, in order to prevent the side plate portion 94a of the carrier 94 from interfering with the sun gear 90 when the axial position of the carrier 94 relative to the clutch outer member 80 deviates due to dimensional tolerance of the inner cylinder portion 80a of the clutch outer member 80, or the like, it becomes necessary to secure a relatively large axial clearance between the side plate portion 94a and the sun gear 90. In the present embodiment, on the other hand, since the sun gear 90 is axially positioned relative to the carrier 94, the axial clearance between the side plate portion 94a and the sun gear 90 can be minimized to the smallest extent possible. In addition, since the sun gear 90 and the carrier 94 are axially coupled together, both the members 90, 94 can be sub-assembled in advance. In case there occurs a relative axial positional deviation between the clutch outer member 80 and the carrier 94, this deviation can be absorbed by the axial play at the coupled portion between the clutch outer member 80 and the sun gear 90. Therefore, there is no problem even if the sun gear 90 is axially positioned relative to the carrier 94. In addition, this axial play can be obtained by extending an open end of the clutch outer member 80 within a range of axially overlapping with the clutch inner member 81. Therefore, the axial length of the transmission will not increase by allowing an axial play.

Figure 3:
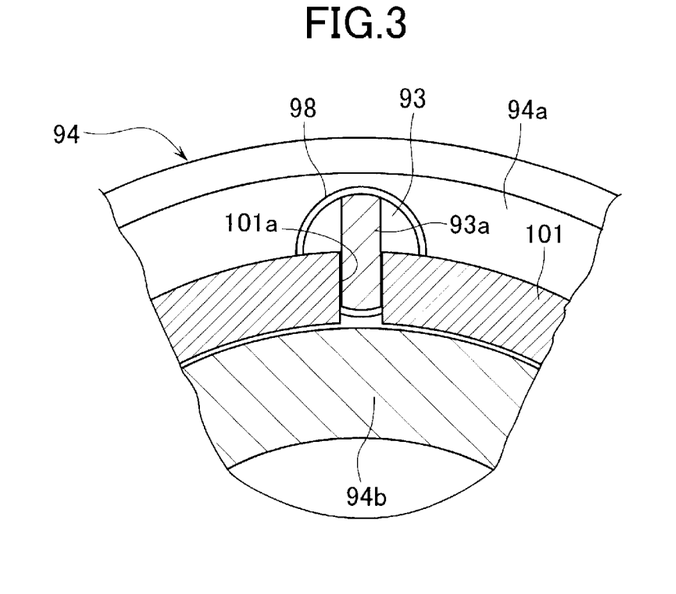
FIG. 3 is a sectional view taken along the line III—III in FIG. 2.

The above-described side plate portion 94a of the carrier 94 in the first planetary gear mechanism 9 has formed therein an annular supporting portion 94b which is fitted into the clutch inner member 101 of the third hydraulic clutch 10. By means of a stopper ring or snap ring 97 which is fitted in this supporting portion 94b, the clutch inner member 101 is prevented from axially dropping out of position relative to the supporting portion 94b. In an end surface of the pinion shaft 93 which protrudes through a shaft hole 94c which is formed in the above-described side plate portion 94a, there is formed, as shown in FIGS. 2 and 3, a first engaging portion 93a which is made up of a non-circular projection. On that end surface of the clutch inner member 101 which is on the side of the side plate portion 94a, there is formed a second engaging portion 101a which is made up of a non-circular recess. When the pinion shaft 93 is in a predetermined phase, which is described in more detail hereinafter, the first engaging portion 93a and the second engaging portion 101a are engaged with each other. Additionally, the first engaging portion 93a may, of course, be formed into a recess, and the second engaging portion 101a may be formed into a projection. Further, the pinion shaft 93 is prevented from axially dropping out of position by a snap ring 98 which is mounted on an outer circumference at the end portion of the pinion shaft 93.

The pinion shaft 93 has formed therein the following holes, i.e.: an axial hole 93b for introducing the lubricating oil which has been collected by an oil guide 94e disposed on a side plate portion 94d which is opposite to the above-described side plate portion 94a of the carrier 94; and radially extending oil holes 93c for feeding the lubricating oil inside the axial hole 93b to that bearing 92a for the planetary pinion 92 which is mounted on the outer circumference of the pinion shaft 93. When the pinion shaft 93 is in a predetermined phase in which the oil holes 93c look toward the radial direction of the carrier 94 so that the lubricating oil is efficiently supplied by the centrifugal force to the bearing 92a through the oil holes 93c, the first engaging portion 93a and the second engaging portion 101a are brought into engagement with each other. In this manner, when the first and second engaging portions 93a, 101a are brought into engagement with each other, the clutch inner member 101 is prevented by the pinion shaft 93 from rotating, and the pinion shaft 93 is prevented by the clutch inner member 101 from rotating off from the above-described predetermined phase. Therefore, simply by arranging the clutch inner member 101 and the pinion shaft 93 to be prevented from axially dropping out of position by means of the snap rings 97, 98, the clutch 101 and the pinion shaft 93 can be fixed to the carrier 94. The assembling of the carrier 94 thus becomes easy.

Figure 4:
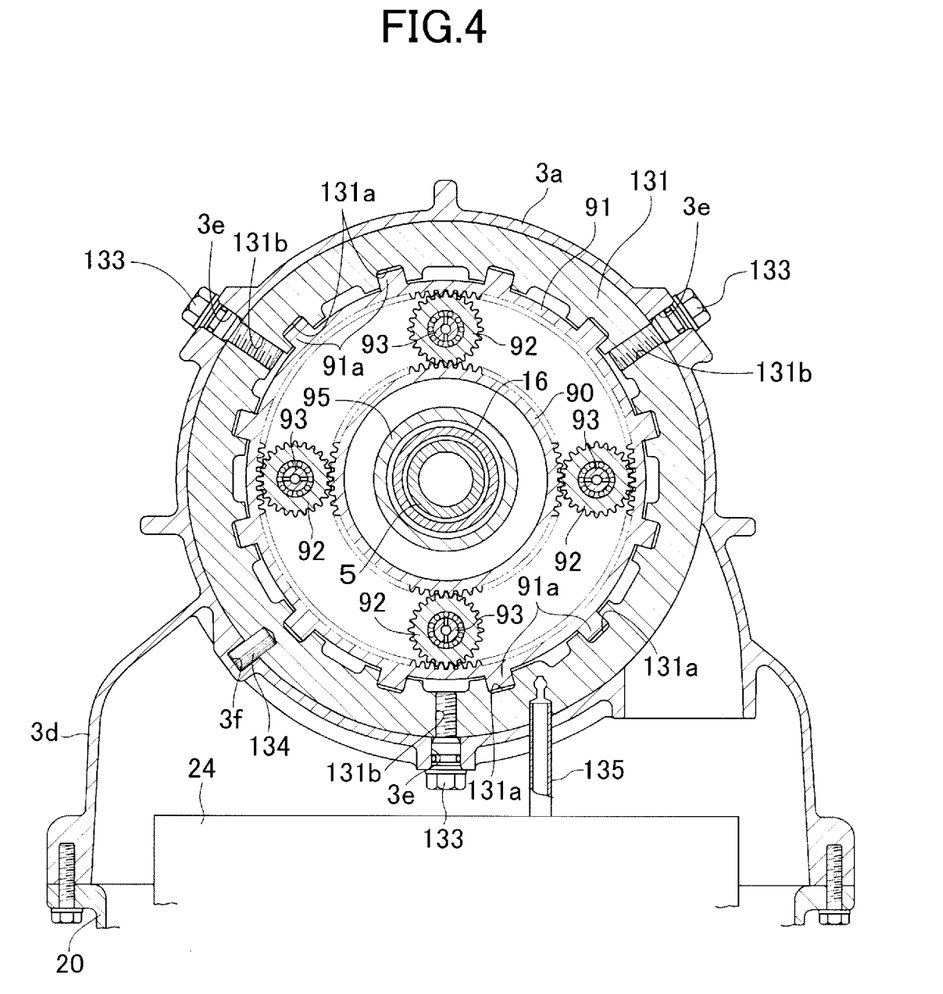
FIG. 4 is a sectional view taken along the line IV—IV in FIG. 1.

In the periphery of the first planetary gear mechanism 9, there is disposed a cylinder portion 131 of the first hydraulic brake 13 which is formed integrally with the brake outer member 130 of the first hydraulic brake 13. This cylinder portion 131 has formed therein, as shown in FIG. 4, a plurality of groove portions 131a of spline shape. A plurality of tooth portions 91a of spline shape corresponding to the groove portions 131a are formed in an outer circumference of the ring gear 91 of the first planetary gear mechanism 9. By thus engaging the tooth portions 91a with the groove portions 131a, the ring gear 91 is prevented from rotating relative to the cylinder portion 131. Then, the cylinder portion 131 has mounted thereon a snap ring 132 which prevents the ring gear 91 from axially dropping out of position. The ring gear 91 is thus fixed to the cylinder portion 131. Further, screw holes 131b are formed in three points on the periphery of the cylinder portion 131, and penetrating holes 3e are formed in the peripheral wall portion of the casing main body 3a in three circumferential portions corresponding to the screw holes 131b. Each bolt 133 which is defined as a fixing member is inserted, from an outer surface of the peripheral wall portion of the casing main body 3a, into the casing main body 3a through each of the penetrating holes 3e and is screwed into each of the screwed holes 131b, whereby the cylinder portion 131 is fixed to the case main body 3a. In this manner, the ring gear 91 of the first planetary gear mechanism 9 is fixed to the casing main body 3a through the cylinder portion 131 of the first hydraulic brake 13. Further, on an inner circumference of the casing main body 3a, there is formed an axially extending guide groove 3f. The cylinder portion 131 is provided with a guide pin 134 which is engaged with the guide groove 3f. It is thus so arranged that, in a phase in which the screw hole 131b and a penetrating hole 104 coincide with each other, a guiding function to insert the cylinder portion 131 into the casing main body 3a can be obtained by the guide groove 3f and the guide pin 134. In the figure, reference numeral 135 denotes a pipe to supply a hydraulic oil pressure for the first hydraulic brake 13 from the valve block 24 to the cylinder portion 131.

In assembling the transmission, the following steps are taken. Namely, the torque converter casing 2 is disposed in such a manner that the input shaft 4 protrudes upward, and the valve block 23 is assembled on top thereof. Then, the first hydraulic clutch 7 and the second hydraulic clutch 8 are assembled in the order mentioned. Thereafter, the first planetary gear mechanism 9 is assembled. In assembling the first planetary gear mechanism 9, the sun gear 90 and the carrier 94 are sub-assembled in advance such that the sun gear 90 is meshed with the planetary pinion 92 in a state in which the clutch inner member 101 of the third hydraulic clutch 10 is mounted on the carrier 94. In this sub-assembled state, the sun gear 90 and the carrier 94 are assembled. Then, in a state in which the ring gear 91 of the first planetary gear mechanism 9 is fixed to the cylinder portion 131, the third hydraulic brake 13 is assembled such that the ring gear 91 is meshed with the planetary pinion 92 of the first planetary gear mechanism 9.

Then, the clutch outer member 100 of the third hydraulic clutch 10 is assembled. Thereafter, the second planetary gear mechanism 11, the third planetary gear mechanism 12 and the one-way clutch 17 are assembled in the order mentioned to thereby assemble the sub-assembly of the inner elements to be contained inside the casing main body 3a. Then, the casing main body 3a is put to cover the sub-assembly of the inner elements to thereby contain the inner elements inside the casing main body 3a. Then, an end piece 3b to which the second hydraulic brake 14 and an inner race 17b of the one-way clutch 17 have been assembled is fastened to the casing main body 3a. A parking gear 18 is then assembled to the output shaft 6 and, after fastening the end chamber 3c, an output flange 19 is assembled to the output shaft 6.

After the sub-assembly of the inner elements has been contained inside the casing main body 3a, the bolts 133 are inserted into the casing main body 3a to thereby fix the cylinder portion 131 of the first hydraulic brake 13 to the casing main body 3a. Thereafter, the oil pan 20 is attached to the skirt portion 3d of the casing main body 3a.

In order to fix the ring gear 91 of the first planetary gear mechanism 9 to the casing main body 3a, the following method may also be considered. Namely, the ring gear 91 is fixedly engaged with the casing main body 3a by means of a snap ring in a state in which the ring gear 91 is engaged, by means of spline, with the casing main body 3a. In this arrangement, however, when the sub-assembly of the inner elements is assembled as described hereinabove, the first hydraulic clutch 7 and the second hydraulic clutch 8 which are positioned on this side of the first planetary gear mechanism 9 as seen from the open end of the torque converter casing 2 of the casing main body 3a become a hindrance, whereby the snap ring can no longer be fitted inside the casing main body 3a. To avoid this problem, the snap ring must be fitted when the first planetary gear mechanism 9 is assembled after a plurality of transmission constituting elements have been assembled from the innermost side in sequence. On the other hand, in the present embodiment, by inserting the bolts 133 into the casing main body 3a from the outside of the peripheral wall portion of the casing main body 3a, the ring gear 91 of the first planetary gear mechanism 9 can be fixed to the casing main body 3a through the cylinder portion 131 of the first hydraulic brake 13. Therefore, the fixing work of the ring gear 91 can be performed without being hindered by the first hydraulic clutch 7 and the second hydraulic clutch 8. It follows that the sub-assembly of the inner elements can be assembled in advance in an open space outside the casing, resulting in an improved workability in the assembly of the transmission. If the ring gear 91 is directly fixed to the casing main body 3a, the vibrations of the ring gear 91 are conveyed to the casing main body 3a, resulting in the liability of the occurrence of noises. In the present embodiment, on the other hand, since the cylinder portion 131 of the first hydraulic brake 13 is interposed between the casing main body 3a and the ring gear 91, the conveyance of the vibrations to the casing main body 3a is restricted, resulting in a reduction of noises.

Figure 5:
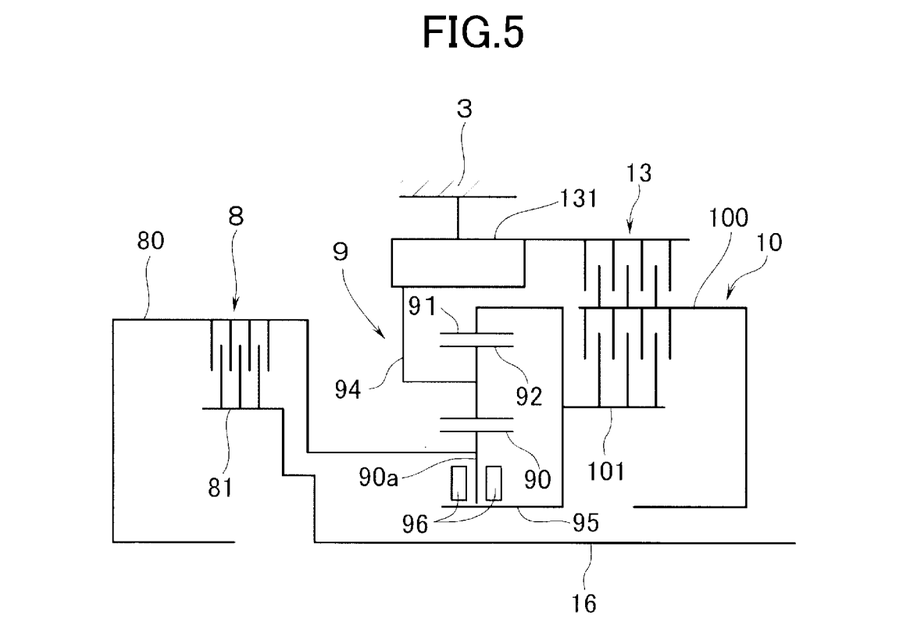
FIG. 5 is a skeleton diagram showing an important portion of another embodiment of the transmission according to the present invention.

An explanation has so far been made about the embodiment in which the ring gear 91 of the first planetary gear mechanism 9 is defined as a fixing element to be fixed to the transmission casing 3, and the carrier 94 is defined as a coupling element to be coupled to the third hydraulic clutch 10. In case the carrier 94 is arranged to be the element to be fixed and the ring gear 91 is arranged to be the coupling element, the following arrangement may be employed as shown in FIG. 5. Namely, the carrier 94 is fixed to the transmission casing 3 through the cylinder portion 131 of the first hydraulic brake 13. A cylindrical portion 95 which is inserted into the inner circumference of the sun gear 90 with a radial clearance therebetween is formed in the ring gear 91. The thrust bearing 96 is mounted on this cylindrical portion 95 in the same manner as in the above-described embodiment. The sun gear 90 is axially positioned relative to the cylindrical portion 95.

It is readily apparent that the above-described transmission equipped with a planetary gear mechanism and a planetary gear mechanism meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A transmission comprising
   a planetary gear mechanism which has an axis of rotation and includes a gear element to be fixed relative to a transmission casing of the transmission, and
   a cylinder portion of a hydraulic brake to be built into said transmission, the cylinder portion being disposed around said planetary gear mechanism and accommodated inside the transmission casing,
   wherein said gear element is fixed to said cylinder portion, and
   wherein said cylinder portion is fixed to said transmission casing by a fixing member which is insertable, in an insertion direction that is not parallel to the axis of rotation, into said transmission casing from an outside of a peripheral wall portion of said transmission casing.

2. A planetary gear mechanism to be built into a transmission, comprising:
   a first element of the planetary gear mechanism which comprises a sun gear;
   a second element of said planetary gear mechanism which comprises one of a ring gear and a carrier,
   said first element and said second element being coupled respectively to a first power transmission member which is disposed on one axial side of said planetary gear mechanism and to a second power transmission member which is disposed on an axially opposite side of said planetary gear mechanism,
   said first element and said second element being engaged with the first power transmission member and the second power transmission member, respectively, in a usually transmissible condition;
   wherein said second element has formed therein a cylindrical portion which is immovable with respect to said second element and is inserted into an inner circumference of said first element with a diametrical clearance therebetween;
   wherein said first element is axially positioned relative to said cylindrical portion through an annular projection, which is formed on an inner circumference of said first member, and
   wherein said first element is coupled to said first power transmission member with an axial play between said first element and said first power transmission member.

3. A planetary gear mechanism to be built into a transmission in which a cylindrical power transmission member, which is disposed on one axial side of the planetary gear mechanism, is coupled to a carrier of said planetary gear mechanism which rotatably supports a planetary pinion through a pinion shaft, said planetary gear mechanism comprising:

- a supporting portion which is formed in a side plate portion on one axial side of said carrier, said supporting portion being fitted into said power transmission member;
- a first engaging portion which comprises one of a non-circular projection and recess formed in an end surface of said pinion shaft which protrudes through a shaft hole formed in said side plate; and
- a second engaging portion which comprises one of a non-circular recess and projection formed in an end surface of said power transmission member which is on a side of said side plate portion, said second engaging portion being engaged with said first engaging portion when said pinion shaft is in a predetermined phase.

4. The planetary gear mechanism according to claim 3, further comprising:

- a first snap ring mounted on said supporting portion so as to prevent said power transmission member from being axially pulled out of position relative to said supporting portion; and
- a second snap ring mounted on said pinion shaft so as to prevent said pinion shaft from being axially pulled out of position relative to said side plate portion.

* * * * *